US006630541B1

(12) United States Patent
Bakker et al.

(10) Patent No.: US 6,630,541 B1
(45) Date of Patent: Oct. 7, 2003

(54) THIXOTROPIC AGENT BASED ON AN ALKYD RESIN

(75) Inventors: Petrus J. Bakker, Bergen op Zoom (NL); Enrico R. A. Rensen, Arnhem (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/564,075

(22) Filed: May 3, 2000

Related U.S. Application Data

(63) Continuation of application No. PCT/EP98/07004, filed on Oct. 19, 1998.

(51) Int. Cl.[7] .............................................. C08L 77/12
(52) U.S. Cl. ...................................... 525/425; 525/434
(58) Field of Search ................................. 525/425, 434

(56) References Cited

U.S. PATENT DOCUMENTS

| | | | |
|---|---|---|---|
| 5,536,871 A | 7/1996 | Santhanam | 560/196 |
| 5,591,793 A | 1/1997 | Rao et al. | 524/310 |

FOREIGN PATENT DOCUMENTS

| | | |
|---|---|---|
| DE | 1234343 | 2/1967 |
| EP | 0 467 533 A1 | 1/1992 |
| EP | 0 553 663 B1 | 8/1993 |
| GB | 915 702 | 1/1963 |
| GB | 1252282 | 11/1971 |

OTHER PUBLICATIONS

*Derwent Patent Abstract* 78.053P (1959).
*Derwent Patent Abstract* 93–244261/31 (1993).

*Primary Examiner*—Ana Woodward
(74) *Attorney, Agent, or Firm*—Joan M. McGillycuddy

(57) ABSTRACT

Proposed is a thixotropic agent for alkyd resins comprising the reaction product of an alkyd resin and a poly(ester)amide obtained by reacting a polycarboxylic acid with a compound of the formula $X_m$—R—$Y_n$, wherein R stands for an organic group having at least 2 carbon atoms, X and Y may be the same or different and stand for a primary or secondary amino group or a hydroxyl group, and m and n are each at least equal to 1, with at least 50 mole % of the polycarboxylic acid being a dimeric fatty acid having at least 36 carbon atoms, wherein in at least 25 mole % of the compound of the formula $X_m$—R—$Y_n$ R stands for a substituted or unsubstituted aromatic group having 6 to 18 carbon atoms and X and Y may be the same or different and stand for a primary or secondary amino group, and in at most 75 mole % of the compound of said formula R stands for a substituted or unsubstituted aliphatic group having 2 to 54 carbon atoms, an araliphatic group having 7 to 18 carbon atoms and/or an aromatic or cycloaliphatic group having 6 to 18 carbon atoms.

13 Claims, No Drawings

THIXOTROPIC AGENT BASED ON AN ALKYD RESIN

This is ac continuation of International Application No. PCT/EP98/07004, with an international filing date of Oct. 19, 1998, designating the United States of America, expressly abandoned after the filing and acceptance of the present application. This application claims priority of Netherlands Patent Application No. 1007423.

BACKGROUND OF THE INVENTION

The invention pertains to a thixotropic agent comprising the reaction product of an alkyd resin and a poly(ester)amide obtained by reacting a polycarboxylic acid with a compound of the formula $X_m$—R—$Y_n$, wherein R stands for an organic group having at least 2 carbon atoms, X and Y may be the same or different and stand for a primary or secondary amino group or a hydroxyl group, and m and n are each at least equal to 1, to an alkyd resin containing such a thixotropic agent, and to a coating composition incorporating such an alkyd resin.

A thixotropic agent of the above-mentioned type is known from U.S. Pat. No. 5,591,793.

The thixotropic agent described in said document is obtained by reacting an alkyd resin with a polyamide based on a polycarboxylic acid, for which preferably use is made of an oligomer obtained from soybean oil, castor oil, tall oil, cotton seed oil, corn oil, kapok seed oil, linseed oil or mixtures thereof, and on a compound of the formula $X_m$—R—$Y_n$, for which, according to the description and the examples, only aliphatic diamines are eligible, as well as on a monocarboxylic acid for capping any reactive groups still present.

Although the thixotropic agents described in said document give favourable results when used in coatings and topcoat compositions based on alkyd resins, it was found that the thixotropic agents are wanting in some respects. For instance, it is very difficult to carry out the preparation of the known thixotropic agents in a reproducible manner. If the reaction is too short, a cloudy product is obtained. If the reaction is continued too long or performed at a too high temperature, the product obtained, while clear, has insufficient thixotropic properties. Moreover, it was found that there is room for improvement both of these products' thermal stability at 45° C. and of the resistance to polar solvents.

DE 1,234,343 discloses a process for the production of thixotropic coatings from (alkyd) oils with polyamide resins, and GB 1,252,282 discloses a thixotropic vehicle composition. However, neither DE 1,234,343 nor GB 1,252,282 discloses the poly(ester)amide component of the present invention.

U.S. Pat. No. 5,536,871 discloses a liquid rheological additive comprising the reaction product of a liquid polyalkoxylated nitrogen containing compound, a polycarboxylic acid, and a liquid diamine. EP 467,533 discloses rheological additives prepared from carboxylic acids and amines. However, none of these documents discloses the alkyd resin or the poly(ester)amide of the present invention.

The known products based on urea have the drawback with urea it is often difficult to obtain clear products. If clear products are obtained, they often give handling problems and their thixotropic properties are wanting.

To overcome these drawbacks polyurethanes have been suggested. However, polyurethanes have the drawback that comparatively large amounts of them need to be incorporated into a coating composition to achieve a sufficiently thixotropic effect, while being comparatively expensive.

SUMMARY OF THE INVENTION

The invention now provides a thixotropic agent for alkyd resins which continues to have high thermal stability at a temperature of at least 45° C., which is easily and reproducibly prepared, and which gives few if any problems when it is incorporated into a coating composition.

The invention consists in that in the thixotropic agent of the known type mentioned in the opening paragraph at least 50 mole % of the polycarboxylic acid is a dimeric fatty acid having at least 36 carbon atoms, in at least 25 mole % of the compound of the formula $X_m$—R—$Y_n$ R stands for a substituted or unsubstituted aromatic group having 6 to 18 carbon atoms and X and Y may be the same or different and stand for a primary or secondary amino group, and in at most 75 mole % of the compound R stands for a substituted or unsubstituted aliphatic group having 2 to 54 carbon atoms, an araliphatic group having 7 to 18 carbon atoms and/or an aromatic or cycloaliphatic group having 6 to 18 carbon atoms.

It should be noted that the possible use of an aromatic diamine in a thixotropic polyamide resin was mentioned in passing in GB-A-915,702. At issue there is always a small quantity in combination with an excess of a primary aliphatic polyamine. On the other hand, EP-B-553 663 (p. 2, line 19) explicitly advises against the use of aromatic amines to prepare a thixotropic agent therefrom.

For that reason it must be considered extremely surprising that it is not only possible to carry out the preparation of the presently proposed thixotropic agents in a readily reproducible manner, but also that the resulting product exhibits remarkably favourable behaviour as regards the handling properties, without this being at the expense of the thermal stability.

BRIEF DESCRIPTION OF THE DRAWINGS

FIG. 1 shows a graph of the rheological behavior of thixotropic agents in the presence of boiling white spirit as a function of time;

FIG. 2 shows a graph of the rheological behavior of thixotropic agents in the presence of polar solvent butyl glycol as a function of time ; and FIG. 3 shows a graph of the rheological behavior of thixotropic agents in the presence of boiling white spirit as a function of temperature.

DETAILED DESCRIPTION OF THE INVENTIONS

The term poly(ester)amide used in the description stands for a polyamide or polyesteramide obtainable by reacting a polycarboxylic acid with a compound of the formula $X_m$—R—$Y_n$, wherein R stands for an organic group having at least 2 carbon atoms, wherein X and Y may be the same or different and stand for a primary or secondary amino group or a hydroxyl group, and wherein m and n are each at least equal to 1.

For the reaction of the polyamide or polyesteramide with the alkyd resin preferably use is made of a poly(ester)amide prepared in the presence of an excess of polycarboxylic acid. Preferably, this excess is 10 to 30 mole %. At least 50 mole % of the polycarboxylic acid which is eligible within the framework of the invention is composed of dimeric fatty acid, by which is meant, according to the invention, a mixture consisting of at least 20 wt. %, commonly at least 80 wt. %, and preferably at least 95 wt. %, of oligomerised fatty acid. Said oligomerised fatty acid generally does not contain more than 10 wt. % of monocarboxylic acid, preferably not more than 4 wt. %. Oligomerised fatty acid generally is prepared by the addition reaction of unsaturated fatty acids obtained from the glycerides of unsaturated fatty acids such as are present in linseed oil, corn oil, kapok seed oil, groundnut oil, cotton seed oil, dehydrated castor oil, tunafish oil, sunflower seed oil, carthamus safflower oil, and soybean oil. The commercially available product preferably are made of unsaturated fatty acids having 18 to 20 carbon atoms and have an acid number of about 190 to 197 mg KOH/g. Examples of suitable dimeric fatty acids originate from Unichema and are commercially available under the trade designation Pripol®. If so desired, the unsaturated reaction product may be hydrogenated.

Examples of polycarboxylic acids which are not included in the group of oligomerised fatty acids are adipic acid, poly(butadiene)dicarboxylic acid, dodecane dicarboxylic acid, and mixtures thereof. If so desired, they may be added to enhance thermal stability.

In at least 25 mole % of the compound of the formula $X_m$—R—$Y_n$ R stands for a substituted or unsubstituted aromatic group having at least 6 carbon atoms and X and Y may be the same or different and stand for a primary or secondary amino group directly attached to the aromatic group.

Optimum results have been obtained using a poly(ester) amide wherein at least 50 mole % of the compound of the formula $X_m$—R—$Y_n$ stood for a substituted or unsubstituted phenylene diamine. Examples of aromatic diamines eligible within the framework of the invention are:

methyl-4-phenylene diamine, 2-methyl-1,3-phenylene diamine, diethyltoluene diamine, o-phenylene diamine, p-phenylene diamine, 2,4,6-trimethyl-1,3-phenylene diamine, 2,4,6-triisopropyl-1,3-phenylene diamine, 1,6-naphthalene diamine, and/or 4,4'-diaminobenzyl anilide.

In this case very favourable results have been obtained so far using 2,4,6-triisopropyl-1,3-phenylene diamine, while optimum results were obtained preparing a poly(ester)amide based on p-phenylene diamine.

Under certain conditions the presence of a small amount, up to 20 mol % with respect to the poly(ester)amide, of an aliphatic or cycloaliphatic diol or diamine may be of advantage in order to prevent possible handling problems such as difficult pumpage of large quantities from storage tanks.

Diols eligible for use according to the invention include aliphatic, cycloaliphatic, araliphatic, and aromatic dihydroxy compounds. Preference is given to diols having 2–15 carbon atoms, such as ethylene glycol, diethylene glycol, propylene glycol, isobutylene glycol, pentamethylene glycol, 2,2-dimethyl trimethylene glycol, hexamethylene glycol, decamethylene glycol, dihydroxycyclohexane, cyclohexane dimethanol, resorcinol, and 1,5-dihydroxynaphthalene. Particularly preferred are aliphatic diols having 2–54 carbon atoms. One example of a highly suitable diol is neopentyl glycol or a diol obtained by hydrogenating a dimeric fatty acid. One example of a cycloaliphatic diol is cyclohexane diol. One example of an araliphatic diol is Dianol® 220 ex Akzo Nobel Chemicals. The bisphenols suitable for use include bis(p-hydroxy)bisphenyl, bis(p-hydroxyphenyl)methane, and bis(p-hydroxyphenyl)propane.

The diamines which, according to the invention, can be used in addition to the already present aromatic diamines include aliphatic, cycloaliphatic or araliphatic diamines. Preference is given to diamines having 2–54 carbon atoms, such as neopentane diamine, 2-methyl-1,5-pentamethylene diamine, ethylene diamine, diethylene triamine, triethylene tetramine, tetraethylene pentamine, pentaethylene hexamine, hexaethylene heptamine, 2-butyl-2-ethyl-1,5-pentane-diamine, diamines obtained from dimeric fatty acids preferably having at least 36 carbon atoms, isophorone diamine, and metaxylene diamine or xylylene diamine. Besides aliphatic diols or diamines there may be used alkanol amines such as ethanolamine and 3-amino-propan-1-ol.

The preparation of the polyamide or polyesteramide to be used in the preparation of the thixotropic agent according to the invention preferably proceeds as described in the literature for analogous products. Such a process generally proceeds as follows. First, the monomers to be polymerised, such as a dimeric fatty acid, phenylene diamine, and, optionally, some other polycarboxylic acid, diamine, alkanol amine and/or diol, are introduced into a solvent such as xylene, and the whole is flushed soundly with nitrogen. The reaction mixture is then heated to a temperature in the range of 160° to 270° C. and kept at said temperature for several hours with simultaneous removal of xylene and water. The polymerisation reaction generally is continued until an $M_w$ in the range of 800 to 20,000 is obtained.

The quantity of poly(ester)amide which is reacted with the alkyd resin to form a thixotropic agent according to the invention advantageously is selected such that the weight ratio of polyamide or polyesteramide to alkyd resin is in the range of 1/50 to 2/1, preferably in the range of 1/20 to 1/1. Optimum results are obtained in the range of 1/10 to 1/5.

The alkyd resins used according to the invention can be obtained by direct esterification of the constituent components, in which case a portion of these components may already have been converted into ester diols or polyester diols, or by transesterification.

Transesterification generally takes place at a temperature between 115 and 250° C., in which process solvents such as toluene and/or xylene also may be present. The reaction generally proceeds in the presence of a catalytic amount of a transesterification catalyst. Examples of transesterification catalysts which may be used include p-toluene sulphonic acid, a basic compound such as an amine or compounds such as calcium oxide, zinc oxide, alkylalkoxy titanates, triphenylbenzyl phosphonium chloride and/or organotin compounds such as Fascat® 4350, 4201, and 4101 ex Elf/Atochem.

Preferably, at least part of the alkyd resin will dry by oxidation because of the incorporation into it of a large number of unsaturated fatty acids, a portion of which may be polyunsaturated. Examples of mono-unsaturated fatty acids are myristoleic acid, palmitoleic acid, oleic acid, gadoleic acid, erucic acid, and ricinoleic acid. Polyunsaturated fatty acids include sorbic acid, linseed oil fatty acid, soybean oil fatty acid, sunflower oil fatty acid, safflower oil fatty acid, wood oil fatty acid, dehydrated ricinus oil fatty acid, tall oil fatty acid. Other monocarboxylic acids suitable for use include tetrahydrobenzoic acid and hydrogenated or non-hydrogenated abietic acid or isomers thereof. Preferably, use is made of safflower oil fatty acid, sunflower oil fatty acid, linseed oil fatty acid, soybean oil fatty acid and/or combinations with synthetic fatty acids, such as Prifac® 5901, 5910, 7953, 7960 ex Unichema. If so desired, the monocarboxylic acids in question can be used wholly or partially as triglyceride, e.g., as vegetable oil, in the preparation of the alkyd resin. Optionally, mixtures of two or more of such monocarboxylic acids or triglycerides may be employed, if so desired in combination with one or more saturated, (cyclo)aliphatic or aromatic monocarboxylic acids, e.g., pivalic acid, 2-ethylhexanoic acid, lauric acid, palmitic acid, stearic acid, cyclopentane carboxylic acid, cyclohexane carboxylic acid, naphthenic acid, benzoic acid, 2-methyl benzoic acid, 4-tert.butyl benzoic acid, and 2,4-dimethyl benzoic acid. Preferably, the amount of monocarboxylic acid used in the preparation of the alkyd resin is such that the monocarboxylic acid constitutes 50–90 mole % of the total amount of carboxylic acids.

If so desired, also polycarboxylic acids may be incorporated into the alkyd resin, e.g., phthalic acid, isophthalic acid, terephthalic acid, 5-tert, butyl isophthalic acid, trimellitic acid, pyromellitic acid, succinic acid, adipic acid, 2,2,4-trimethyl adipic acid, azelaic acid, sebacic acid, dimerised fatty acids, cyclopentane-1,2-dicarboxylic acid, cyclohexane-1,2-dicarboxylic acid, 4-methylcyclohexane-1,2-dicarboxylic acid, tetrahydrophthalic acid, endomethylene-cyclohexane-1,2-dicarboxylic acid, butane-1,2,3,4-tetracarboxylic acid, endo-isopropylidene cyclohexane-1,2-dicarboxylic acid, cyclohexane-1,2,4,5-tetracarboxylic acid, butane-1,2,3,4-tetracarboxylic acid, and adducts of ethylenically unsaturated carboxylic acids such as acrylic acid, maleic acid, and fumaric acid to ethylenically unsaturated monocarboxylic acids such as 5(6)-carboxy-4-hexyl-2-cyclohexene-1-octanoic acid. Optionally, the carboxylic acids in question can be used as anhydrides or in the form of an ester, e.g., an ester of an alcohol having 1–4 carbon atoms.

Additionally, the alkyd resin can be composed of di- or polyvalent hydroxyl compounds. Examples of suitable divalent hydroxyl compounds are ethylene glycol, 1,3-propane diol, 1,6-hexane diol, 1,12-dodecane diol, 3-methyl-1,5-pentane diol, 2,2,4-trimethyl-1,6-hexane diol, 2,2-dimethyl-1,3-propane diol, 2-methyl-2-cyclohexyl-1,3-propane diol, and the diols obtained by reduction of the corresponding dimeric fatty acids by preferably at least 36 carbon atoms. Examples of suitable triols are glycerol, trimethylol ethane, and trimethylol propane. Suitable polyols having more than 3 hydroxyl groups are pentaerythritol, sorbitol, and etherification products of the aforesaid compounds, such as ditrimethylol propane and di-, tri-, and tetrapentaerythritol. Preferably, compounds having 3–12 carbon atoms are employed, e.g., glycerol, pentaerythritol and/or dipentaerythdtol.

The weight average molecular weight of the thus prepared alkyd resin which is then reacted with the polyamide to form the thixotropic agent according to the invention generally is at least 50,000 and preferably is between 65,000 and 90,000. The molecular weight of the alkyd resin or alkyd resins making up 70 to 95 wt. % of the final binder generally is much lower and amounts to at least 1400 and, when used in a coating with a high solids content, at most 2800, but favourable results can also be achieved with higher molecular weights, albeit at the expense of the solids content in the final coating composition.

The thixotropic agents according to the invention can be used as an alkyd resin for a coating composition. It is also possible to incorporate the thixotropic agent in an alkyd resin. To obtain an alkyd resin with sufficient thixotropic properties, at least 5 wt. % of the thixotropic agent should be incorporated in the resin. Preferably, 5 to 100 wt. %, and more preferably 5 to 30 wt. % of the thixotropic agent is incorporated in the alkyd resin. The invention further pertains to a coating composition comprising the alkyd resin of the invention.

The thixotropic agents according to the invention are especially suitable for incorporation into air drying alkyd resins for air drying paints. Generally, these include a small quantity of organic solvents which preferably have a flash point of at least 55° C. and a boiling point in the range of 140° C. to 260° C. By way of example may be mentioned aliphatic, cycloaliphatic or aromatic hydrocarbon having, on average, 9–16 carbon atoms per molecule, alcohol ethers, and alcohol ether acetates or mixtures thereof. Examples of such solvents include the hydrocarbon solvents available under the trade designations Shellsol® H, Shellsol® K, Shellsol® D40, and Shellsol® AB, all ex Shell Chemicals, and under the trade designation Solvesso®-150 or Exxsol® D40 ex Exxon, and compounds such as ethyl diglycol, ethylglycol acetate, butylglycol, butylglycol acetate, butyl diglycol, butyl diglycol acetate, and methoxypropylene glycols acetate. Preferably, the solvent has a boiling point in the range of 170° C. to 230° C. Small quantities of ethers, esters, ketones, alcohol esters, and alcohols and glycols may likewise be present.

In addition to the aforementioned thixotropic agents and air drying alkyd resins, the coating compositions incorporating the thixotropic agents according to the invention may contain other thixotropic agents and all sorts of additives or adjuvants, e.g., pigments, dyes, fillers, antioxidants, anti-ozonants, gloss-reducing agents, sterically hindered amines, bactericides, fungicides, anti-skinning agents, perfumes, antifoaming agents, drying stabilisers, finely dispersed waxes and polymers such as hydrocarbon resins, colophonium resins, phenol resins, and ketone resins.

Suitable pigments include natural or synthetic pigments which may be transparent or not. Examples of suitable pigments are titanium dioxide, red iron oxide, orange iron oxide, yellow iron oxide, phthalocyanine blue, phthalocyanine green, molybdate red, chromium titanate, and earth pigments, such as ochres, green earths, umbers, and raw or burnt Siennas. In finishing compositions pigments generally are used in an amount of at most 150 wt. %, preferably 50–125 wt. %, vis-a-vis the alkyd resin (calculated as dry solids). In addition, other thixotropic agents may be present, such as organically modified magnesium montmorillonites. e.g., those available under the trade designations Bentone® 27 and 38 ex National Lead Co., but preferably adducts of a diisocyanate, say, hexamethylene diisocyanate, to a monoamine or hydroxy-monoamine having 1 to 5 aliphatic carbon atoms, e.g., benzyl amine, adducts of a symmetrical aliphatic or homocyclic diisocyanate to a mono- or diamine having at least a primary amino group and an ether group, and adducts of an isocyanurate trimer of a diisocyanate having 3–20 carbon atoms to an amine having one or more primary amino groups.

Coating compositions incorporating the thixotropic agents according to the invention can be applied to the substrate in any suitable manner, e.g., by means of rolling, spraying, brushing, sprnkling, flow coating or dipping. Preferably, the composition is applied with a brush.

Suitable substrates include pre-treated or non-pre-treated metal or synthetic, wood, concrete, cement, brick, paper or leather substrates. Suitable metals include iron, steel, and aluminium. The applied coat can be cured very suitably at a temperature of, e.g., 0–40° C. Optionally, a curing temperature above 40° C. may be employed, as a result of which the curing time can be reduced.

The invention will be further illustrated with reference to the following examples. Needless to say, these are exemplified embodiments to which the invention is not limited.

Unless otherwise specified, "parts" stands for "parts by weight" and "%" for "percent by weight" in what follows.

The acid number and hydroxyl number values are given in mg KOH per gram of resin. The polycarboxylic acids used in the examples were Pripol® 1017 and Pripol® 1022 ex Unichema. Both products comprise a mixture of about 80 parts of dimeric fatty acid having 36 carbon atoms, about 20 parts of trimeric fatty acid having 54 carbon atoms, and 1 to 2 parts of a monocarboxylic acid having 18 carbon atoms.

The solids content was determined in accordance with ISO 3251–1993, after. 1 hour of heating at 125° C.

Example I (Preparation of Polyesteramide Based on 2,4,6-Triisopropyl-1,3-phenylene Diamine)

677.6 parts (1.15 moles) of Pripol® 1022 (ex Unichema), 100.1 parts (0.43 mole) of 2,4,6-triisopropyl-1,3-phenylene diamine, and 44.8 parts (0.43 mole) of neopentyl glycol were introduced into a 2-liter flask; Added to this was 1 vol. % of xylene. Under a stream of nitrogen the reaction mixture was heated to 260° C., after which the water containing xylene was removed azeotropically. After a reaction period of 6 hours a product was obtained which was poured into a metal basin at 240° C. The thus obtained product had a softening point of 242° C., an acid number of 45.7, a number average molecular weight of 2580 and a weight average molecular weight of 8688.

Example II (Preparation of Basic Alkyd)

2083.5 parts (7.4 moles) of fatty acid from tall oil, 759.4 parts (5.1 moles) of phthalic anhydride, 648.3 parts (4.8 moles) of pentaerythritol, and 8.8 parts (0.09 mole) of maleic anhydride were charged into a 5-l flask. At 250° C. xylene was added, and the reaction mixture was kept at that temperature for 5 hours. After cooling a product with the following properties was obtained:

| Solids content in accordance with ISO 3251, wt. % | 96,7 |
|---|---|
| Acid number (mg KOH/g) | 10,0 |
| Number average molecular weight Mn | 2461 |
| Weight average molecular weight Mw | 70351 |

Example III (Preparation of Thixotropic Agent According to the Invention)

320 parts of the basic alkyd of Example II were charged together with 80 parts of the polyester amide of Example I into a 1-l flask. After nitrogen being passed at 4 l/hour the temperature was raised to 220° C., whereupon the reaction mixture was kept at said temperature for 80 minutes.

Next, 375 g of white spirit were added and the temperature was raised to 170° C. and maintained at that level until a virtually clear solution was obtained. After cooling to 120° C. the mass was poured into a basin and then cooled down to room temperature.

The following properties were determined on the product:

| Solids content | 50,3 |
|---|---|
| Acid number (mg KOH/g) | 16,3 |
| Hydroxyl number (mg KOH/g) | 24 |
| Number average molecular weight Mn | 3567 |
| Weight average molecular weight Mw | 122779 |

The product at rest had the properties of a gel and became low-viscous after being shaken for some time. This property remained virtually unchanged in the presence of an equal quantity by weight of butyl glycol, even at a temperature of 45° C.

Example IV (Preparation of Polyesteramide Based on P-phenylene Diamine)

A polyesteramide was prepared in a manner analogous to that indicated in Example I, with the proviso that for the diamine this time use was made of p-phenylene diamine.

1763.6 parts of dimeric fatty acid (Pripol® 1017 ex Unichema), 119.9 parts (1.11 moles) of p-phenylene diamine, and 116.5 parts (1.12 moles) of neopentyl glycol were charged into a 2-l flask. To this was added 1 vol. % of xylene. Under a stream of nitrogen the reaction mixture was heated to 260° C., after which the water containing xylene was removed azeotropically. After a reaction period of 6 hours a product was obtained which was poured into a metal basin at 240° C. The thus obtained product solidified at 100° C., had an acid number of 41.6, a number average molecular weight of 2147, and a weight average molecular weight of 7552.

Example V (Preparation of Polyesteramide Based on p-phenylene Diamine)

A polyesteramide was prepared in a manner analogous to that indicated in Example I, with the proviso that for the diamine this time use was made of p-phenylene diamine.

1763.6 parts of dimeric fatty acid (Pripol® 1017 ex Unichema), 191.8 parts (1.78 moles) of p-phenylene diamine, and 46.6 parts (0.45 moles) of neopentyl glycol were charged into a 2-l flask. To this was added 1 vol. % of xylene. Under a stream of nitrogen the reaction mixture was heated to 260° C., after which the water containing xylene was removed azeotropically. After a reaction period of 6 hours a product was obtained which was poured into a metal basin at 240° C. The thus obtained product solidified at 112° C., had an acid number of 41.5, a number average molecular weight of 2214, and a weight average molecular weight of 7642.

Example VI (Preparation of Thixotropic Agent According to the Invention)

In a manner analogous to that indicated in Example III 640 parts of the basic alkyd of Example II were charged together with 160 parts of the polyesteramide of Example IV into a 2-l flask. After nitrogen being passed at 4 l/hour the temperature was raised to 220° C. and the xylene/water mixture present was distilled off. The reaction mixture was then kept at said temperature for another 60 minutes. Next, 800 g of Shellsol® D60 were added and the temperature was kept at 170° C. until a virtually clear solution was obtained. This was followed by cooling to room temperature.

The following properties were determined on the product:

| Solids content | 50,2 |
|---|---|
| Acid number (mg KOH/g) | 14,0 |
| Hydroxyl number (mg KOH/g) | 16 |
| Number average molecular weight Mn | 3346 |
| Weight average molecular weight Mw | 113341 |

The product at rest had the properties of a gel and became low-viscous after being shaken for some time. This property remained virtually unchanged at a temperature of 45° C., but was disturbed in the presence of an equal quantity by weight of butyl glycol.

Example VII (Preparation of Thixotropic Agent According to the Invention)

In a manner analogous to that indicated in Example III 640 parts of the basic alkyd of Example II were charged together with 160 parts of the polyesteramide of Example V into a 2-l flask. After nitrogen being passed at 4 l/hour the temperature was raised to 220° C. and the xylene/water mixture present was distilled off. The reaction mixture was then kept at said temperature for another 60 minutes. Next, 800 g of Shellsol® D60 were added and the temperature was kept at 170° C. until a virtually clear solution was obtained. This was followed by cooling to room temperature.

The following properties were determined on the product:

| Solids content | 50,0 |
|---|---|
| Acid number (mg KOH/g) | 14,0 |
| Hydroxyl number (mg KOH/g) | 16 |
| Number average molecular weight Mn | 3412 |
| Weight average molecular weight Mw | 116386 |

The product at rest had the properties of a gel and became low-viscous after being shaken for some time. This property remained virtually unchanged in the presence of an equal quantity by weight of butyl glycol, even at a temperature of 45° C.

Example VIII (Preparation of Thixotropic Agent According to the Invention)

In a manner analogous to that indicated in Example III a thixotropic agent was prepared by reacting the basic alkyd of Example II with a polyamide prepared from p-phenylene diamine and dimeric fatty acid (Pripol® 1022 ex Unichema). After nitrogen being passed at 4 l/hour the temperature was raised to 220° C. and the xylene/water mixture present was distilled off. The reaction mixture was then kept at said temperature for another 60 minutes. Next, 800 g of Shellsol® D60 were added and the temperature was kept at 170° C. until a virtually clear solution was obtained.

After cooling a product with the following properties was obtained:

| Solids content | 50,0 |
|---|---|
| Acid number (mg KOH/g) | 14,2 |
| Hydroxyl number (mg KOH/g) | 28 |
| Number average molecular weight Mn | 5271 |
| Weight average molecular weight Mw | 160873 |

The product at rest had the properties of a gel and became low-viscous after being shaken for some time. This property remained virtually unchanged in the presence of an equal quantity by weight of butyl glycol, even at a temperature of 45° C.

Example IX (Preparation of Thixotropic Agent According to the Invention)

In a manner analogous to that indicated in Example III a thixotropic agent was prepared by reacting the basic alkyd of Example II with a polyamide prepared, from p-phenylene diamine and dimeric fatty acid (Pripol® 1009 ex Unichema). After nitrogen being passed at 4 l/hour the temperature was raised to 190° C. and the xylene/water mixture present was distilled off. The reaction mixture was then kept at said temperature for another 300 minutes.

Next, 800 g of Shellsol® D60 were added and the temperature was kept at 170° C. until a virtually clear solution was obtained.

After cooling a product with the following properties was obtained:

| Solids content | 50,0 |
|---|---|
| Acid number (mg KOH/g) | 14,2 |
| Hydroxyl number (mg KOH/g) | 28 |
| Number average molecular weight Mn | 5271 |
| Weight average molecular weight Mw | 160873 |

The product at rest had the properties of a gel and became low-viscous after being shaken for some time. This property remained virtually unchanged in the presence of an equal quantity by weight of butyl glycol, even at a temperature of 45° C.

Example X (Preparation of Thixotropic Agent According to the Prior Art)

In a manner analogous to that indicated in Example III a thixotropic agent was prepared by reacting the basic alkyd of Example II with a polyamide prepared from ethylenediamine and dimeric fatty acid (Pripol® 1022 ex Unichema).

After cooling a product with the following properties was obtained:

| Solids content | 49,6 |
|---|---|
| Acid number (mg KOH/g) | 13,2 |
| Hydroxyl number (mg KOH/g) | 26 |
| Number average molecular weight Mn | 4857 |
| Weight average molecular weight Mw | 145253 |

The product at rest had the properties of a gel and became low-viscous after being shaken for some time. However, this property was disturbed when the temperature was raised to, say, 45° C., and also in the presence of an equal quantity by weight of butyl glycol.

Example XI (Preparation of Thixotropic Agent According to the Prior Art)

In a manner analogous to that indicated in Example III a thixotropic agent was prepared by reacting the basic alkyd of Example II with a polyamide prepared from hexamethylenediamine and dimeric fatty acid (Pripol® 1022 ex Unichema).

After cooling a product with the following properties was obtained:

| Solids content | 49,8 |
|---|---|
| Acid number (mg KOH/g) | 13,8 |
| Hydroxyl number (mg KOH/g) | 27 |
| Number average molecular weight Mn | 4512 |
| Weight average molecular weight Mw | 142841 |

The product at rest had the properties of a gel and became low-viscous after being shaken for some time. However, this property was disturbed when the temperature was raised to, say, 45° C., and also in the presence of an equal quantity by weight of butyl glycol.

Example XII (Determination of Rheological Properties)

In the example below the rheological behaviour of a number of thixotropic agents according to the invention is compared with that of two prior art thixotropic agents. In all cases the measurements were carried out on solutions containing equal quantities by weight of thixotropic agent and high-boiling white spirit (FIGS. 1 and 3) and the polar solvent butyl glycol (FIG. 2), respectively.

The rheological properties were measured using a Bohlin® CS-50 controlled stress rheometer with cone/plate geometry CP1/40 (cone angle 1°, diameter 40 mm). The time-dependent measurements in FIGS. 1 and 2 were carried out at a temperature of 23° C. The temperature-dependent measurements were carried out in a temperature range of 23° to 70° C. with the temperature being increased by 1° C./minute. Before the start of the measurements each time the structure was disturbed first by applying a shearing rate at a rotational speed of 6500/s. In each case the shearing rate was applied long enough not to undergo any change during at least 30 seconds. The outcome of the measurements is shown in the accompanying FIGS. 1, 2, and 3.

In these figures the visco-elastic structural build-up line is represented as a function of time (FIGS. 1 and 2) and as a function of temperature (FIG. 3).

The reference numerals in the figures refer to the following thixotropic agents:

| thixotropic agent | reference numeral |
| --- | --- |
| Example VIII (invention) | 1 |
| Example III (invention) | 2 |
| Example VI (invention) | 3 |
| urea modified resin | |
| (SG395WA ex Cray Valley) | 4 |
| Example X (comparative) | 5 |
| Example XI (comparative) | 6 |

The curve of the measuring data represented in FIG. 1 shows that the visco-elasticity level of the thixotropic agents according to the invention is not only higher than that of the known thixotropic agents (at the same concentration), but also that, after a few minutes, the thixotropic agents according to the invention have a faster recovery of the visco-elastic structure than is the case with the known thixotropic agents.

The curve of the measuring data represented in FIG. 2 shows that in the presence of a polar solvent such as butyl glycol the visco-elastic structure of the thixotropic agent of Example VI (invention) as well as that of Examples X and XI (prior art) disappears almost completely.

The curve of the measuring data represented in FIG. 3 in high-boiling white spirit as a function of temperature clearly shows that up to 45° C. none of the three thixotropic agents according to the invention gives rise to problems. By contrast, the visco-elastic properties of the known thixotropic agents based on ethylene diamine or hexamethylene diamine decrease sharply between 35° and 45° C., while those of the known thixotropic agent SG395WA ex Cray Valley just continue to increase. In the latter case problems may arise during industrial-scale pumpage of the thixotropic agent for incorporation into a paint.

Example XIII (Preparation of Coating Composition Containing a Thixotropic Agent According to the Invention)

Two coating compositions were prepared, one based on the thixotropic agent of Example VI and, for comparison, the other based on a widely used commercially available thixotropic agent, Supergelkyd® 395WA ex Cray Valley. When said last thixotropic agent is ground prior to incorporation into a coating composition, the temperature rises. In that case it is possible that the visco-elastic level will rise so sharply as to create problems when homogeneously distributing the thixotropic agent in the coating composition. Incorporation into a coating composition can only be achieved with the use of a special mixer.

| Formulation of paint (parts by weight) | A | B |
| --- | --- | --- |
| Thixotropic agent acc. to Example VI (invention) | 17 | |
| Thixotropic agent 395WA (ex Cray Valley) | | 17 |
| Gloss-reducing paste | 16 | 16 |
| Washing paste | 2 | 2 |
| Titanium white dispersion | 50 | 50 |
| Propylene glycol | 0,5 | 0,5 |
| Siccative (Co, Ca, Sr) | 2,5 | 2,5 |
| Antiskinning agent (methylethyl ketoxim) | 0,2 | 0,2 |
| Shellsol ® D70 | 1,8 | 1,8 |

The gel strength of the two coating compositions was determined with the aid of an ICI-sheen tester. For coating composition A (invention) it was 14 g/cm$^2$, for coating composition B 5 g/cm$^2$.

What is claimed is:

1. A thixotropic agent comprising the reaction product of an alkyd resin and a poly(ester)amide obtained by reacting a polycarboxylic acid with a compound of the formula $X_m$—R—$Y_n$, wherein R stands for an organic group having at least 2 carbon atoms, X and Y may be the same or different and stand for a primary or secondary amino group or a hydroxyl group and m and n are each at least equal to 1, wherein at least 50 mole % of the polycarboxylic acid Is a dimeric fatty acid having at least 36 carbon atoms, wherein at least 25 mole % of the compound of the formula $X_m$—R—$Y_n$, R stands for an aromatic group having 6 to 18 carbon atoms and X and Y may be the same or different and stand for a primary or secondary amino group, and wherein at most 75 mole % of the compound R stands for an aliphatic group having 2 to 54 carbon atoms, an araliphatic group having 7 to 18 carbon atoms and/or a cycloaliphatic group having 6 to 18 carbon atoms.

2. A thixotropic agent according to claim 1, wherein the poly(ester)amide is prepared using an excess of polycarboxylic acid.

3. A thixotropic agent according to claim 2, wherein the poly(ester)amide is prepared using a molar excess of 10 to 30 mole % of polycarboxylic acid.

4. A thixotropic agent according to claim 1, wherein at least 50 mole % of the compound of the formula $X_m$—R—$Y_n$ is a substituted or unsubstituted phenylene diamine.

5. A thixotropic agent according to claim 4, wherein the diamine is 2,4,6-triisopropyl-1,3-phenylene diamine.

6. A thixotropic agent according to claim 4, wherein the diamine is p-phenylene diamine.

7. A thixotropic agent according to claim 4, wherein the nonaromatic compound of the formula $X_m$—R—$Y_n$ is neopentyl glycol.

8. A thixotropic agent according to claim 4, wherein the molecular weight $M_w$ of the poly(ester)amide is in the range of 800 to 20,000.

9. A thixotropic agent according to claim 4, wherein the molecular weight $M_w$ of the alkyd resin to be reacted with the poly(eater)amide is at least 50,000.

10. A thixotropic agent according to claim 4, wherein the weight ratio of poly(ester)amide to alkyd resin is in the range of 1/20 to 1/1.

11. An alkyd resin comprising 5 to 100 wt. % of a thixotropic agent according to claim 1.

12. An alkyd resin according to claim 11 comprising 5 to 30 wt. % of the thixotropic agent.

13. A coating composition comprising an alkyd resin according to claim 11 as a binder.

* * * * *